Patented June 4, 1935

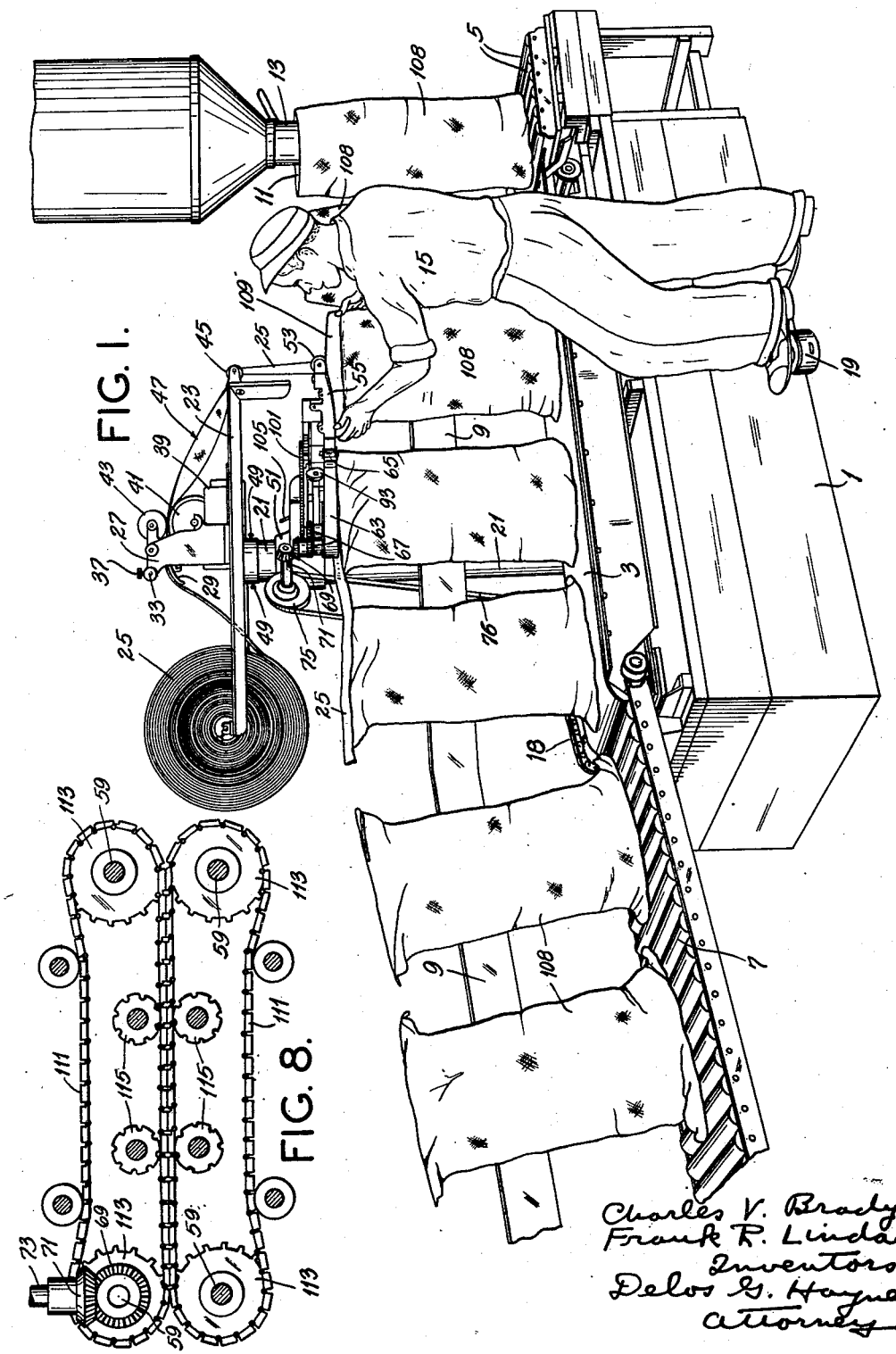

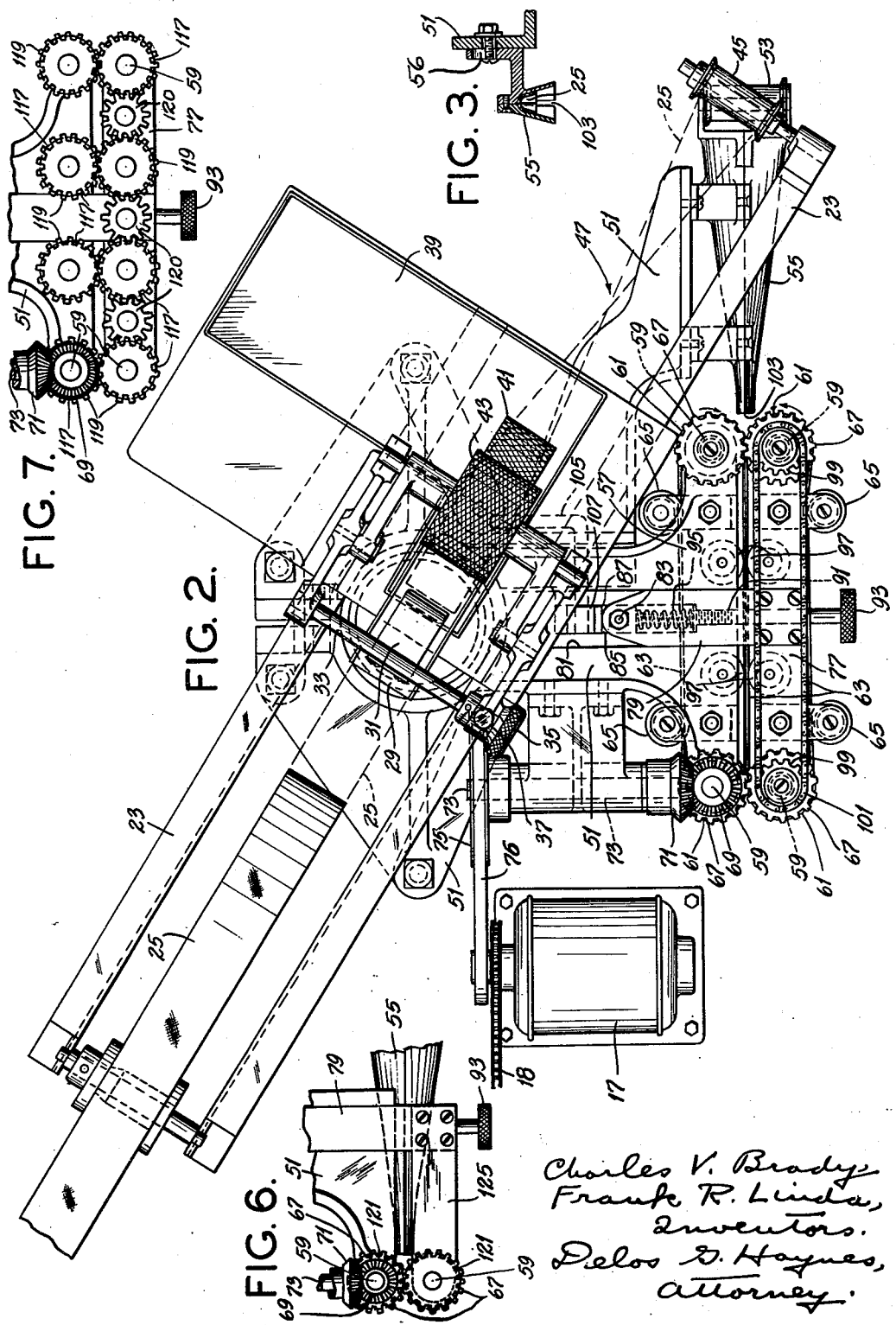

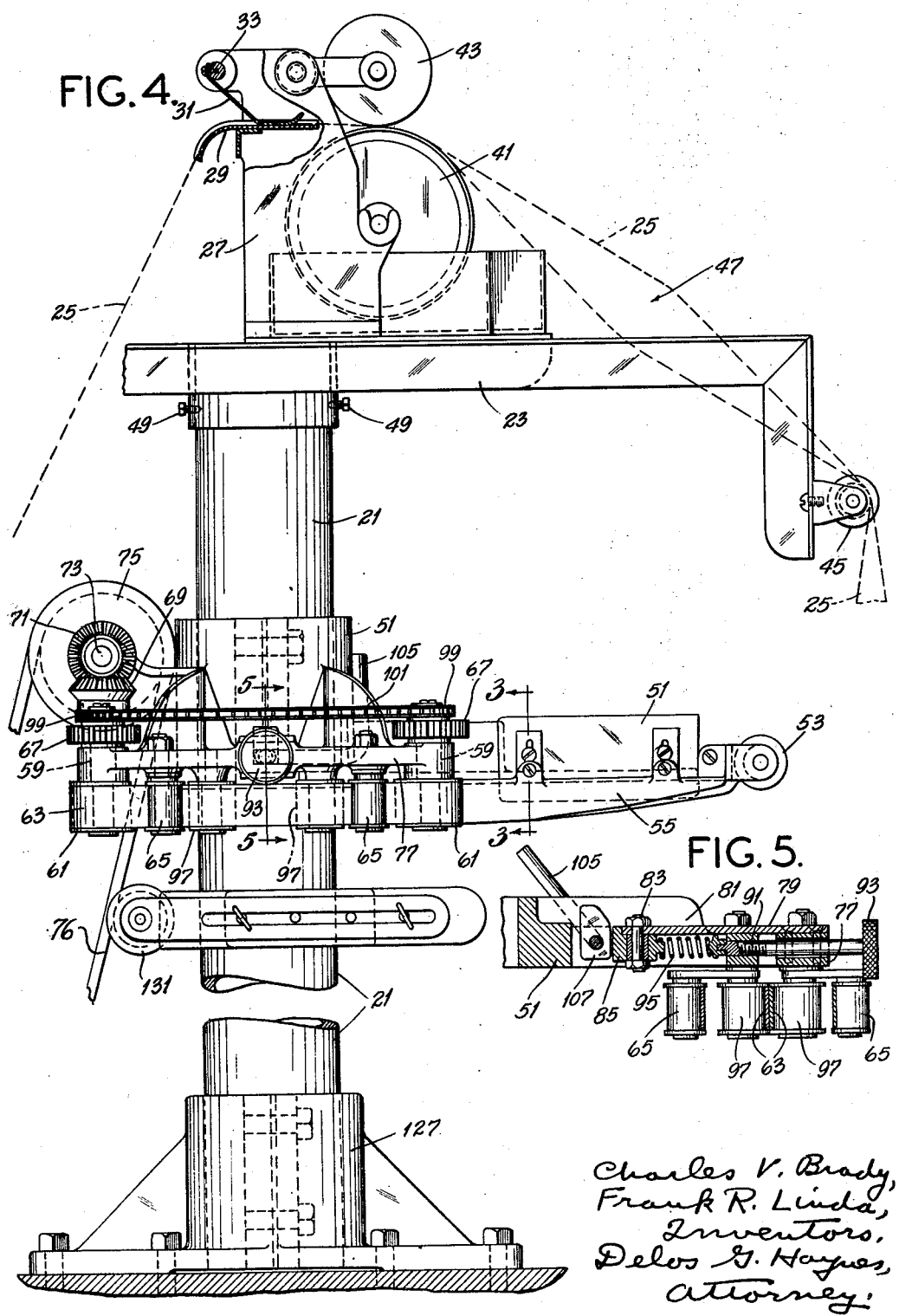

2,003,337

UNITED STATES PATENT OFFICE 2,003,337

BAG CLOSING MACHINE

Charles V. Brady, Webster Groves, and Frank R. Linda, St. Louis, Mo., assignors to Bemis Bro. Bag Co., St. Louis, Mo., a corporation of Missouri Application February 17, 1934, Serial No. 711,702

12 Claims. (Cl. 216—20)

This invention relates to bag closing machines, and with regard to certain more specific features, to machines of this class for closing taped seam bags.

Among the several objects of the invention may be noted the provision of a bag closing machine for closing the top seam of a filled bag, said seam being made according to the disclosure of United States Patent 1,853,013 issued to Charles V. Brady, dated April 5, 1932; the provision of a machine of the class described which shall automatically apply adhesive to a taping strip, and fold and compress said taping strip over the mouth of a filled bag; and the provision of a machine of the class which is operable with maximum convenience to the operator and which has a high output rate. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which is illustrated one of various possible embodiments of the invention, Fig. 1 is a perspective view of the operating machine;

Fig. 2 is a plan view of the machine;

Fig. 3 is a cross section taken on line 3—3 of Fig. 4;

Fig. 4 is a front elevation;

Fig. 5 is a vertical section taken on line 5—5 of Fig. 4;

Fig. 6 is a fragmentary detail showing a modification of the compressing means;

Fig. 7 is a view similar to Fig. 6 showing another modification; and,

Fig. 8 is a view similar to Fig. 7 showing a third modification.

Similar reference characters indicate corresponding parts throughout the several views of the drawings.

Referring now more particularly to Fig. 1, there is shown at numeral 1 a support for a double-reach, driven conveyor belt 3 which receives open filled bags from a platform composed of idle rollers 5. The belt 3 is driven from motor 11 by a chain drive 18. The belt 3 delivers closed filled bags to a gravity roller chute 7, the bags leaning against a rail 9 in their travel. Bags placed on the platform of idle rollers 5 have their open mouths 11 placed under a filler opening 13 by means of which they are filled, a suitable valve being used for controlling flow through the opening 13. Thereafter the filled, open-mouthed bags are manually pushed from the rollers 5 onto and along with the belt 3 and into juxtaposition with respect to the machine to be described. After the machine has closed the bag mouths, they are automatically advanced to the gravity chute 7 and delivered to a suitable point of take-off. The operator 15 controls the motor 17 of the closing machine by means of a foot switch 19.

Referring in further particular to Figs. 2 and 4, the closer per se will be seen to comprise a standard 21 carrying an overhanging head 23. On one end of the head 23 is a support for a supply roll of closure tape 25, said tape corresponding to the tape referred to in said Patent 1,853,013. Briefly, this tape consists of a strip of woven material to which liquid latex is applied and the tape then folded and compressed over the open mouth of the bag.

The head 23 supports a bracket 27 which in turn carries a tensioning device comprising a channel 29 engaged by a spring 31, the latter being on an adjustable shaft 33 which may be moved by means of a hand wheel 35 and maintained in a predetermined position by a thumb screw 37 (Figs. 1 and 2). Thus, by turning the hand wheel 35 clockwise tension may be increased on material drawn through the tension device, the same being maintained at predetermined values by locking the shaft in adjusted position with said thumb screw 37.

The head 23 also carries a sump 39 for adhesive such as liquid latex, the adhesive in said sump 39 being maintained at a constant level by suitable means (not shown).

The bracket 27 carries a removably journaled roll 41 adapted to dip into the adhesive in the sump 39 and to be engaged by the strip 25 as it comes from the tensioning device. The strip 25 is held against the adhesive roll 41 by means of a pivoted idler roll 43. Thus it will be seen that by drawing the strip 25 over the roll 41, it is provided on one side thereof with a coating of adhesive liquid such as liquid latex.

At the outer end of the head 23 is a guide roller 45 which engages the strip 25 on its non-adhesive side, this being effected by giving the strip 25 a half twist as it proceeds from the adhesive roll 41 to roll 45 (see numeral 47). The head 23 is rotatable on the standard 21, the same being held in predetermined angular position by set screws 49.

At a lower elevation on the standard 21 is provided a bracket 51 which carries an endwise receiving roll 53 which feeds the tape 25 into a creaser head 55, a cross section of which is shown in Fig. 3 with the strip 25 therein and showing the same being creased. The creaser head 55 is adjustable vertically and horizontally by a slot and bolt combination 56.

At the rear end of the creaser 55 the bracket 51 is so formed as at numeral 57 to support a pair of vertical shafts 59 which carry pulleys 61 over which a belt 63 is trained, the latter being maintained in tight position by idler pulleys 65. The shafts 59 also carry gears 67 above the pulleys and the left-hand shaft 59 (Fig. 2) is provided with a bevel gear 69 which is driven from a bevel gear 71, the latter being on a shaft 73 which in turn is driven by a drive 75 from said motor 17.

Slidably mounted on said bracket 51 is a secondary bracket 77 which has a tongue 79 slidable in a groove 81 of said bracket 51. The tongue 79 is attached at 83 to a cross head 85 which slides in a slot 87 (see also Fig. 5). A screw 91 operated from a hand wheel 93 is adapted to control the motion of a cross head 85 by means of a resilient spring connection 95, whereby said bracket 77 may be resiliently pressed toward the bracket 51.

The bracket 77 also carries corresponding shafts 59 having gears 67 and pulleys 61 thereon with a corresponding belt 63 and idlers 65. A second group of idlers 97 on the frames 51 and 77 insure straight adjacent reaches of said belt 63. In order that the belts 63 may be moving at equal speeds where adjacent, equal sprockets 99 and a chain drive 101 are used between the shaft 59 on the bracket 77. The gears 67 on the bracket 77 are meshed with the corresponding gears 67 on the main bracket 51. Rotation of the drive 75 thus results in movement being effected through the bevel gears 71 and 69, thereby driving the set of gears 67 on the bracket 51 in a clockwise direction, as shown and the set of gears 67 on the secondary bracket 77 in a counterclockwise direction (as shown). The adjacent reaches of the belt 63 are placed adjacently to the rear mouth 103 of the creaser 55 so that as the creased strip 25 emerges from the mouth 103 it is gripped between the adjacent reaches of the belts 63.

In order that the bracket or carriage 77 may be moved outwardly to disengage the inner reaches of belt 63, an arm 105 is provided to which is attached a cam 107 (Fig. 5). When the cam 107 is thrown clockwise the cross head 85 is thrown to the right, against the compression of spring 95, thereby throwing the carriage 77 to the right and relieving the compression between belt reaches, as well as separating said reaches.

The operation of the device is as follows:

The operator 15 receives the filled and openmouthed bags 108 from the support 5 and holds the opposite sides of the open mouths adjacently, as shown at 109. He also advances the bags so that the parallel mouth sides 109 are surrounded by the strip of material 25 as it is being creased in the creaser 55. The adhesive of the strip 25 thus engages the oppositely located sides 109 of the bag mouth. The operator may then release his hold, whereupon the bag is drawn along by the conveyor belt 3 and the creased strip, the latter flowing between the adjacent reaches of belts 63 where it is compressed and creased over the sides 109. The belts not only press the strip to the bags but assist in power translation of the bags on and with the belt 3.

As the bags leave the belts 63 they have their mouths closed by the creased strip. The strip is then cut between bags, thereby providing individual closures. The bags then automatically advance to the gravity roller chute 7 where they are discharged.

It will be understood that the operator controls the motor 17 from the foot switch 19 and that he need not continuously push the bags on the conveyor 3, because the creased strip and the driven conveyor 3 are effective as a drive as advance is made. All that the operator needs to do is to move the bag from the support 5 to the conveyor 3. The operator may or may not operate the machine continuously, depending upon individual preference.

In Fig. 8 is shown an alternative method of compressing the creased strip against the bag mouth comprising a pair of link belts 111 passing over sprockets 113, instead of over pulleys. In this case inner idler sprockets 115 are used for effecting compression between reaches of the belt.

In Fig. 7 is shown a compressing means which is independent of belts, the same comprising a plurality of compressor rollers 117 without belts and driven by means of a gear train 119 including suitable idlers 120 for obtaining proper rotation of the rolls. This compressor unit is also positioned behind the creaser 55 when it is used.

In Fig. 6 is shown another form of compressor unit employing only a single pair of compressor rolls 121 with a single pair of gears 67. In this form of the device only one-half of the auxiliary brackets 77 needs to be used and this has been renumbered as 125.

The support 21 is held to the floor by means of a boot 127. It will be understood that the main bracket 51 and the head 23 are rotatably adjustable and that the bracket 51 may be changed in elevation to different bag heights. Inasmuch as adjustment is only necessary when installing the machine, any necessary adjustment may be made in the setting of the motor 17 at that time, so that the drive 75 is properly aligned.

An adjustable idler 131 is used against the belt 76 of the drive 75 for tensioning said belt.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

We claim:

1. A bag closing machine comprising a supporting conveyor adapted to receive and support filled bags having open mouths, means adapted to fold a closure strip and cause the same to cover juxtaposed edges of the bag mouth, means for applying adhesive to the strip prior to application of the same to the bag mouth, and travelling means adapted to receive the bag mouths with the strip thereon to compress the strip over the mouth and to assist the movement of the bag on said supporting conveyor.

2. A bag closing machine comprising a belt adapted to receive and support filled bags having open mouths, means adapted to fold a closure strip and cause the same to cover juxtaposed edges of the bag mouth, means for applying adhesive to the strip prior to application of the same to the bag mouth, and travelling means adapted to receive the bag mouths with the strip thereon to compress the strip over the mouth and to help move the bag, said supporting belt being caused to move at the same rate as said travelling means.

3. In a bag closing machine a folder for closure tape, means in said folder accommodating the folded tape and the mouth of the bag within the tape, compression means adapted to withdraw the folded tape and bag mouth from said folder, said compression means comprising parallel reaches of belt, means for supporting the parallel reaches, means for resiliently pressing said reaches toward one another, and driving means for said reaches so that said adjacent portions thereof shall move in the same direction.

4. In a bag closing machine a folder for closure tape, means in said folder accommodating the folded tape and the mouth of the bag within the tape, compression means adapted to withdraw the folded tape and bag mouth from said folder, said compression means comprising parallel reaches of belt, means for supporting the parallel reaches, means for resiliently pressing said reaches toward one another, driving means for said reaches so that said adjacent portions thereof shall move in the same direction and means for relieving the pressure between reaches.

5. In a bag closing machine a folder for closure tape, means in said folder accommodating the folded tape and the mouth of the bag within the tape, compression means adapted to withdraw the folded taped bag mouth from said folder, said compression means comprising parallel reaches of belt, means for supporting the parallel reaches, means for resiliently pressing said reaches toward one another, driving means for said reaches so that said adjacent portions thereof shall move in the same direction, and idling means adapted to maintain the belts in substantial surface contact with the strip where they compress the strip.

6. In bag closing apparatus, compression means comprising means for mounting two reaches of belt, resilient means for compressing said reaches toward one another, driving means for driving said reaches so that the adjacent portions move in the same direction at the same velocity, and means for delivering to said compression means bags and a strip of material folded over their closed mouths.

7. In bag closing apparatus, compression means comprising means for mounting two reaches of belt, resilient means for compressing said reaches toward one another, driving means for driving said reaches so that the adjacent portions move in the same direction at the same velocity, means for delivering to said compression means bags with a strip of material folded over their mouths, and emergency means for moving the juxtaposed belt reaches one from the other against the force tending normally to resiliently hold them together.

8. In a closing machine, compression means comprising juxtaposed rolls, means resiliently pressing said rolls together, means for supplying a folded strip to said rolls with bag mouths within the fold of the strip, and means for driving said rolls so that juxtaposed surfaces against said strip move in the same direction at substantially the same velocity.

9. In a closing machine, compression means comprising juxtaposed rolls, means resiliently pressing said rolls together, means for supplying a folded strip to said rolls with bag mouths within the fold of the strip, means for driving said rolls so that juxtaposed surfaces against said strip move in the same direction at substantially the same velocity and means for separating the rolls against the force resiliently holding them together.

10. In a bag closing machine, compressing means comprising a pair of adjacently located movable members, means for driving said members so that adjacent surfaces move in the same direction and at substantially the same velocity, means for delivering between said members a strip folded over open bag mouths, means for resiliently forcing said members together to press said strip against the bag mouths, and means for adjusting the resilient forcing means.

11. In a bag closing machine, compressing means comprising a pair of adjacently located movable members, means for driving said members so that adjacent surfaces move in the same direction at substantially the same velocity, means for delivering between said members a strip folded over open bag mouths, means for resiliently forcing said members together to press said strip against the bag mouths, means for adjusting the resilient forcing means, and means for overcoming said force and separating said member to release the pressure on said strip.

12. In a bag closing machine, compressing means comprising a pair of adjacently located movable members, means for driving said members so that adjacent surfaces move in the same direction at substantially the same velocity, means for delivering between said members a strip folded over open bag mouths, means for resiliently forcing said members together to press said strip against the bag mouths, means for adjusting the resilient forcing means, means for overcoming said force and separating said members to release the pressure on said strip, means for applying adhesive to said strip before it reaches said folding means, and tensioning means therefor.

CHARLES V. BRADY.
FRANK R. LINDA.

DISCLAIMER 2,003,337.—*Charles V. Brady*, Webster Groves, and *Frank R. Linda*, St. Louis, Mo. BAG CLOSING MACHINE. Patent dated June 4, 1935. Disclaimer filed July 29, 1936, by the assignee, *Bemis Bro. Bag Co*.

Hereby enters this disclaimer to claims 9, 11, and 12 of said specification.

[*Official Gazette August 25, 1936*]